United States Patent [19]
Ohno

[11] 3,720,296
[45] March 13, 1973

[54] INCHING AND TWO SPEED PLANETARY GEAR DRIVES FOR PRESSES

[75] Inventor: Eiji Ohno, Komatsu, Japan

[73] Assignee: Kabushiki Kaisha Komatsu Seisakusho, Tokyo-to, Japan

[22] Filed: May 3, 1971

[21] Appl. No.: 139,609

[52] U.S. Cl................192/3.52, 74/661, 192/4 R, 192/91 A
[51] Int. Cl.............................................F16d 67/00
[58] Field of Search........192/7, 4 R, 4 C, 18 A, 3.52; 74/DIG. 11, 661

[56] References Cited

UNITED STATES PATENTS

| | | | |
|---|---|---|---|
| 2,860,529 | 11/1958 | Sommer | 192/4 R |
| 3,020,990 | 2/1962 | Liv | 192/18 A |
| 3,503,278 | 3/1970 | Livezey | 74/661 |

*Primary Examiner*—Benjamin W. Wyche
*Attorney*—Toren & McGeady

[57] ABSTRACT

In a driving system of mechanical presses, a driving device for presses comprising a clutch section and a brake section for affording to rotate the driving shaft at a high speed or at low speed or for stopping the driving shaft.

3 Claims, 5 Drawing Figures

INVENTOR.
EIJI OHNO
BY Toren and McGeady
ATTORNEYS

INVENTOR
EIJI OHNO
BY Toren and McGeady
ATTORNEYS

INVENTOR
EIJI OHNO
BY Toren and McGeady
ATTORNEYS

INCHING AND TWO SPEED PLANETARY GEAR DRIVES FOR PRESSES

BACKGROUND OF THE INVENTION

A clutch and a brake are the most important parts in a driving system of mechanical presses. The performance of each of the clutch or brake used in a press effects the working ratio and the productive capacity considerably, and moreover it often causes the source of failures so that utmost caution has to be taken for its maintenance and handling. This is because a clutch is destined to transmit an extremely large and impulsive torque and its working frequency is considerably high, and the brake, in cooperating with the clutch, has to assure a safe and positive operation of the press. It is a matter of extreme importance, in the operation of a press, how to improve the performances of the clutch and the brake, and to combine their operation effectively.

The serviceable life or durability of the material used as the friction portion in a conventional dry-type clutch-brake as a driving means for presses is so short, and if the maintenance is not proper, it becomes unusable, and causes unexpected troubles. In a conventional clutch-brake device in which a clutch portion and the brake portion are constituted integrally, and the timing for the engagement or disengagement of the clutch portion is effected by means of a connecting rod, the braking force is decreased by the dragging of the clutch portion due to shearing of oil when the clutch portion is disengaged and the brake portion is applied. Such a decrease in braking force is liable to occur particularly at a low temperature, and such a decrease in the braking force is quite dangerous.

SUMMARY OF THE INVENTION

The object of the present invention is to provide a wet type device for driving a press which comprises providing a clutch section and a brake section, the brake section consisting of a high speed portion and a low speed portion, and all lining materials in the brake section and clutch section being adapted to rotate in an oil bath.

Another object of the present invention is to provide a device for driving a press, wherein a driving shaft, to which is fixed a driving pinion for driving the main gear of the press, and a rotating shaft of the brake section is aligned on the same axis, and wherein the driving shaft and the rotating shaft are not coupled directly, but the driving shaft is allowed to stop even when the rotating shaft is rotating.

Still another object of the present invention is to provide a driving device for a press wherein timing regulation of the engaging and disengaging of the brake and the release and application of the clutch are carried out by a timing value provided in the operating circuit of the device, and similarly, switching of engaging or disengaging of the high speed portion in the brake section, and switching of engaging or disengaging of the low speed portion are also effected by means of a timing valve provided in the operating circuit, whereby the brake including the high speed portion and the low speed portion are utilized effectively.

A further object of the present invention is to provide a driving device for a press, when the slide of the press is moved, it is moved at a high speed in idling periods, while the slide is moved at a low speed in working periods, whereby the productivity of the press work can be much improved.

Still further object of the present invention is to provide a driving device for a press which makes it possible to reduce relatively the size of the flywheel, owing to the fact of transmitting the torque to the driving shaft in reducing the rotating speed of the flywheel, so that the driving device becomes compact as a whole.

DETAILED DESCRIPTION OF THE INVENTION

Figure 1:
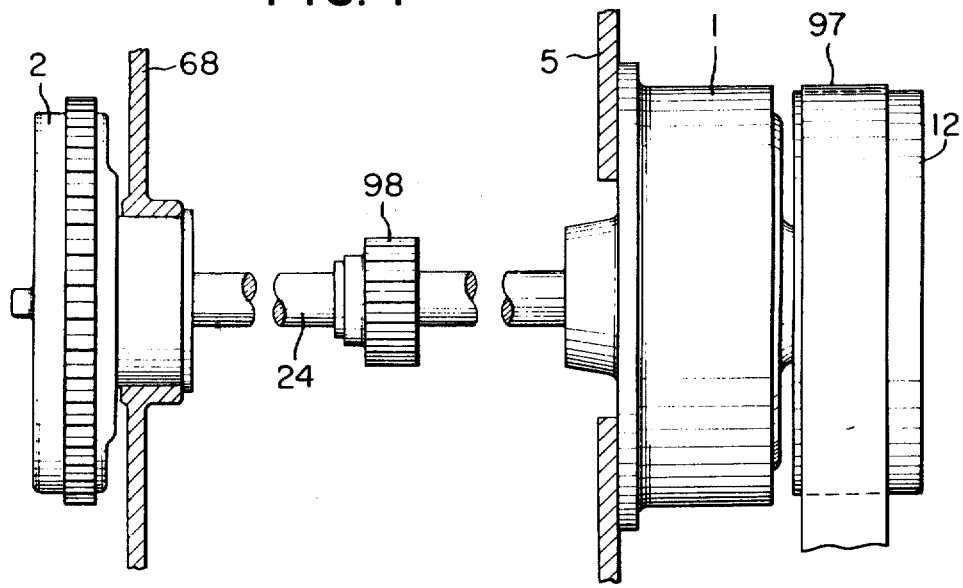
FIG. 1 is a side view of a driving device for a press embodying the present invention.

In the driving device for presses according to the present invention, the brake section 1 and the clutch section 2 are arranged separately.

The brake section 1 is constituted so that speed is made variable in two stages, thus, the section is provided with a high speed portion 3 and a low speed portion 4.

The lining materials in the brake section 1 are adapted to rotate in an oil bath.

The brake section 1 is fixed to a side wall 5 of the crown of the press. Namely, the peripheral end portion of a brake casing 6 in the brake section 1 is secured on the side wall 5 by means of bolts 7, a supporting member 8 is fixed on the other end of said brake casing 6, and a brake chamber 9 is formed by the brake casing 6 and the supporting member 8.

A bearing 11 is fitted on the external periphery of a cylindrical projection 10 of the supporting member 8, and a flywheel 12 is rotatably mounted on this bearing 11.

A rotating shaft 13 is provided located at the center of the brake chamber 9, the shaft 13 extends to the inner side of the cylindrical projection 10 of said supporting member 8. A cover 14 and the rotating shaft 13 are coupled by bolts 15 whereby said flywheel 12 and the rotating shaft 13 rotate integrally by the cover 14, and the flywheel 12 and the cover 14 are connected by means of bolts 16. In this manner, the rotation of the flywheel 12 can be transmitted to the rotating shaft 13.

On the other end of said rotating shaft 13, there are formed a high speed sun gear portion 17 and a low speed sun gear portion 18. A bottomed hole 19 is formed at the end surface on the other end of the rotating shaft 13, and a bearing 20 is fitted into this bottomed hole 19.

A rotating body 23 is fitted rotatably on the inner peripheral surface of the cylindrical projection 21 of the brake casing 6 through a bearing 22. A spline portion formed inside the rotating body 23 and the end portion of a driving shaft 24 are spline-fitted, a short shaft 25 projecting from the end surface of the driving shaft 24 is inserted into the bearing 20 of said rotating shaft 13, so that the end portion of the rotating shaft 13 is supported rotatably by said short shaft 25. Accordingly the rotation of the rotating shaft 13 is not transmitted directly to the driving shaft 24.

A high speed plate holding element 28 and a low speed plate holding element 29 are fixed in an annular recess 26 formed on the inner peripheral surface of the brake casing 6 with an intermediary of a pressure plate 30 between these holding elements 28 and 29 by means of bolts 27.

A ring body 33 for the high speed portion is held on a supporting portion 32 fixed on the supporting member 8 by bolts 31, and an ring body 36 for the low speed portion is held by a supporting portion 35 fixed on the clutch casing 6 by bolts 34. The ring body 33 is formed with toothed portion 37 throughout all the inner periphery, and lining materials 38, 38 . . . are slidably mounted on the outer periphery of the ring body 33. Disk plates 39 held on said high speed plate holding member 28 and the lining materials 38 are inserted alternatively one to the other and are also formed engageably and disengageably. The ring body 36 has toothed portion 40 provided on all the inner periphery thereof, and lining materials 41, 41 . . . are fixed on the outer periphery. The lining materials 41 and the disk plates 42 held on said low speed plate holding member 29 are inserted alternatively and formed engageably and disengageably.

A flange portion 43 is formed at the inner end of said rotating body 23, and a plurality of short shafts 44 are secured circumferentially at equal spacings to one another on said flange portion 43 in such a manner as to project laterally and horizontally.

Two planet gears 45, 46 are rotatably mounted on each of said short shafts 44, 44 . . . , the planet gears 45, 45 . . . are engaged with said sun gear portion 17 and the inner peripheral toothed portion 37 of the ring body 33, and the planet gears 46, 46 . . . are engaged with said sun gear portion 18 and the inner peripheral portion 40 of the ring body 36.

The numerals 47, 48, 49 designate distance pieces, and which set the position of the planet gears 45, 46. The numeral 50 shows a stop ring which serves to secure the planet gears 45, 46 on the short shafts 44.

An annular cylinder chamber 53 is formed by a stepped portion 51 formed inside the brake casing 6 and by a stepped portion 52 formed outside the supporting portion 35. A passage 54 communicating with the cylinder chamber 53 is provided on the brake casing 6, and an opening 55 is connected with the air supply line.

Further, an annular cylinder chamber 58 is formed by a stepped portion 56 formed inside the supporting member 8 and by a stepped portion 57 formed outside the supporting portion 32. A passage 59 communicating with the cylinder chamber 58 is provided on the supporting member 8, and an opening 60 is connected with the air supply line.

An annular piston 61 is inserted inside the cylinder chamber 53. The annular piston 61 is slidable in the cylinder chamber 53 through O-rings 62, 63. On the active side of the annular piston 61, there is formed an annular projection 64, and when the active end surface of the annular projection 64 is advanced towards the end surface of the assembly consisting of said disk plates 42 and the lining materials 41 and is placed in abutment therewith, and at the same time when a compressed air is supplied into the cylinder chamber 53 through the passage 54, the active end surface of the annular piston 61 presses the end surface of the assembly of the disk plates 40 and the lining materials 41, and when the supply of the compressed air is cut off, the annular piston 61 retracts by the elastic force of the spring 65, whereby the pressing on the assembly of the disk plates 40 and the lining materials 41 by the active end surface is released.

In the similar manner, when the compressed air is supplied into the cylinder chamber 58 through the passage 59, the annular piston 66 fitted in the cylinder chamber 58 is advanced, and the end surface of the assembly consisting of the disk plates 39 and the lining materials 38 is pressed and moved by the active end surface of the annular piston 66, and when the supply of the compressed air is cut off, the annular piston 66 is retracted by the elastic force of the spring 67, so that the pressing on the assembly by the annular piston 66 is released.

Next, operation of the clutch section 2 will be described.

The clutch section 2 is mounted on a mounting hole 69 formed in the side wall 68 of the press crown through a bearing 70. Thus, the clutch section 2 is set by inserting a cylindrical projection 72 of a clutch casing 71 into the bearing 70 of said mounting hole 69, and by securing a stopper 74 on the end surface of the cylindrical projection 72 by means of bolts 73.

The driving shaft 24 is extended and inserted into the clutch casing 71. A center 75 is splined on the extended end of the driving shaft 24, and the center 75 is fixed by securing a stopper 77 on the driving shaft 24.

Lining materials 78, 78 are mounted slidably on the outer periphery of the center 75.

A disk plate holder 79 is fixed on the inner peripheral surface of the casing 71, the disk plates 80, 80 . . . and the lining materials 78, 78 . . . are inserted alternatively so as to form the assembly. In this case, a plane abutting surface 81 is formed on the inner end surface of the casing 71, and the end surface of the assembly is made freely to contact with the abutting surface 81.

On the periphery of the casing 71, there are provided an annular projection 82 projecting outside, and an annular recess 83 formed inside the periphery. On the annular projection 82, there is surmounted an annular cover member 84. An annular groove 85 is formed inside the cover member 84, and a cylinder chamber 86 is formed by the wall surface of the annular groove 85 and the end surface of the annular projection 82.

Furthermore, an annular actuating member 88 provided with a recess 87 corresponding to the annular recess 83 of the casing 71 is provided, and the projecting end surface 89 of the actuating member 88 is made abuttable against the assembly consisting of the disk plates 80 and the lining materials 78.

In this case, the advance and retraction of the actuating member 88, by supply and discharge of the compressed air to the cylinder chamber 86, are effected by fixing the outer end of bolts 90 to the cover member 84, passing the bolts 90 through the holes 91 in the casing 71, fixing the inner end to the actuating member 88, and a spring 92 is inserted between the annular recess 83 of the casing 71 and the recess 87 of the actuating member 88.

In the casing 71, there is formed a passage 94 communicating with the air supply line through a connecting portion 93, and the passage 94 is open to the cylinder chamber 86.

Toothed portion 95 is formed on the outer periphery of the casing 71, and an inching pinion 96 is engaged with the toothed portion 95.

The inching pinion 96 serves to rotate the driving shaft 24 at a low speed when the brake is opened and the clutch is applied. In FIG. 1 a belt 97 is shown for transmitting rotation from an electric motor (not shown) to the flywheel 12. A driving pinion 98 is fixed with the driving shaft 24. An inching motor (not shown) is operated by opening the brake, applying the clutch and opening a band brake (not shown) which is always applied except during the operation of the micro-inching, the inching pinion 96 being rotated by the inching motor, the driving shaft being rotated through the toothed portion 95 by means of the inching pinion 96, and then a driving pinion 98 is rotated integrally. The rotation of the driving pinion 98 causes rotation of a main gear (not shown) of the press so as to operate the press.

Figure 4:
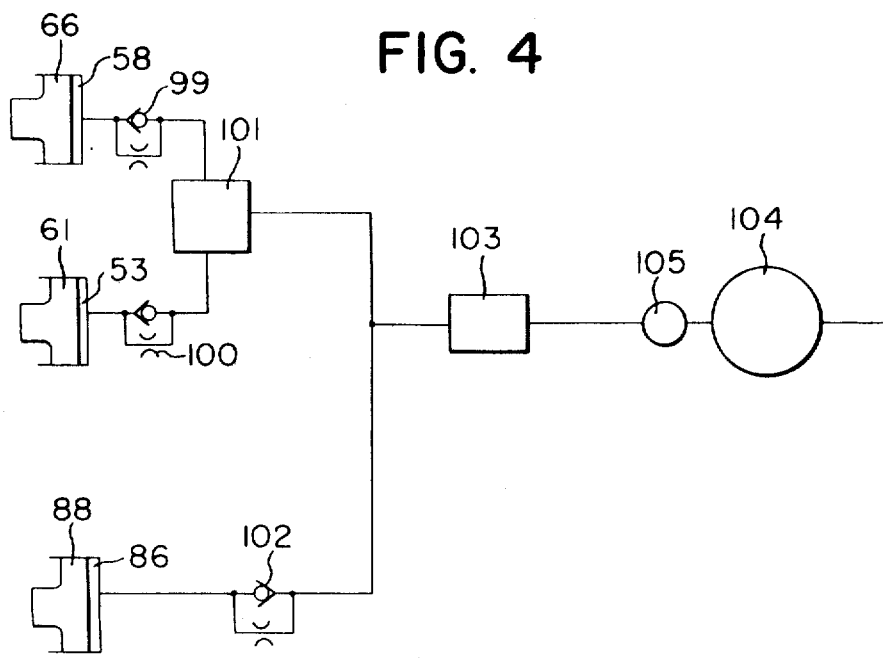
FIG. 4 is an operating circuit for the driving device.
Figure 2:
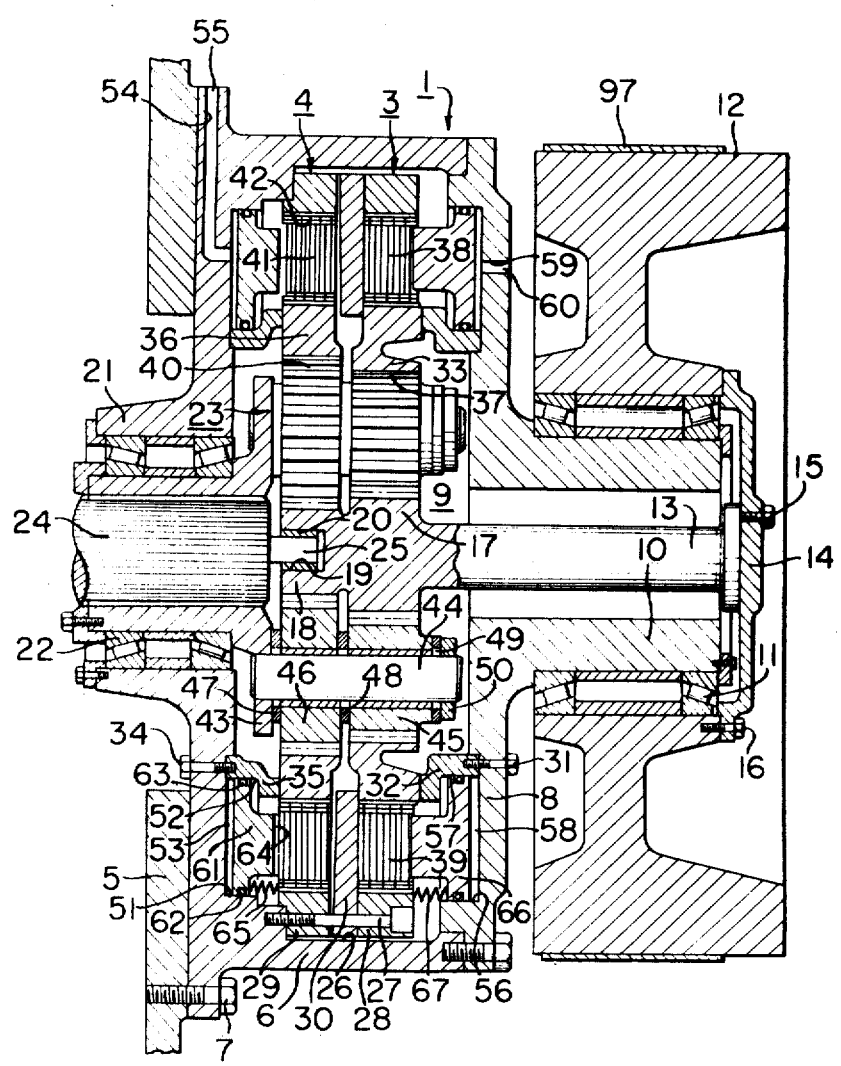
FIG. 2 is a sectional view of a brake section.

FIG. 4 shows the operational system of the parts. In the drawing, 99 shows a timing valve for the high speed portion, 100 shows a timing valve for the low speed, 101 shows a ratio control valve for high speed and low speed, 102 shows a timing valve for clutch, 103 shows a clutch brake directional control valve for supplying and stopping air for each of the valves 101, 102; 104 is an air tank reserving compressed air supplied through air line from the plant, and 105 is a lubricator.

The device according to the present invention operates as follows:

First, opening the clutch brake directional control valve 103, and at the same time opening the high speed side of the directional control valve 101, then the air under pressure is introduced into the cylinder chamber 58 for high speed. The pressure of air in the cylinder chamber 58 moves the annular piston 66 to the left as seen in the drawing, whereby the lining materials 38 together with the disk plates 39 are pressed against the pressure plate 30.

Accordingly, the ring body 33 becomes unable to rotate. Under such a condition, when the motor is operated and the rotating shaft 13 is rotated through the flywheel 10, the planet gears 45, 45 . . . for high speed are made to rotate along the toothed portion 37 formed on the inner periphery of the ring body 33 while making rotation on its own axis, by the sun gear portion 17 the rotating shaft 13.

The planet gear 45 is mounted on the short shaft 44, and since the short shaft 44 is secured on the rotating body 23, it is rotated. Since the driving shaft 24 is secured by spline with the rotating body 23, they rotate integrally, rotating the main gear (not shown) of the press by the driving gear 98 fixed on the driving shaft 24, and drives the slide (not shown) of the press at high speed.

Next, opening the clutch brake ratio control valve 103, and operating the ratio control valve 101 to the low speed side, then compressed air is introduced into the cylinder chamber 53 for low speed through the passage 54, which shifts the annular piston 61, and the lining materials 41 together with the disk plates 42 are pressed against the pressure plate 30. Thus the ring body 36 for low speed becomes unable to rotate.

The planet gears 46, 46 . . . while rotating by themselves rotate around the sun along the toothed portion 40 on the inner periphery of the ring body 36. Since the planet gear 46 is fixed on the short shaft 44, and the short shaft 44 is fixed on the rotating body 23, the rotating body 23 and the driving shaft 24 rotate integrally by the rotation of the planet gears 46, 46, about their own axes and along the sun gear portion 18, causing the driving gear 98 to rotate at low speed. The low speed rotation of the driving gear 98 causes the slide of the press to rotate at low speed. When one of the high speed portion and low speed portion is put under an operational state, the ring body on the other part runs idle.

Figure 3:
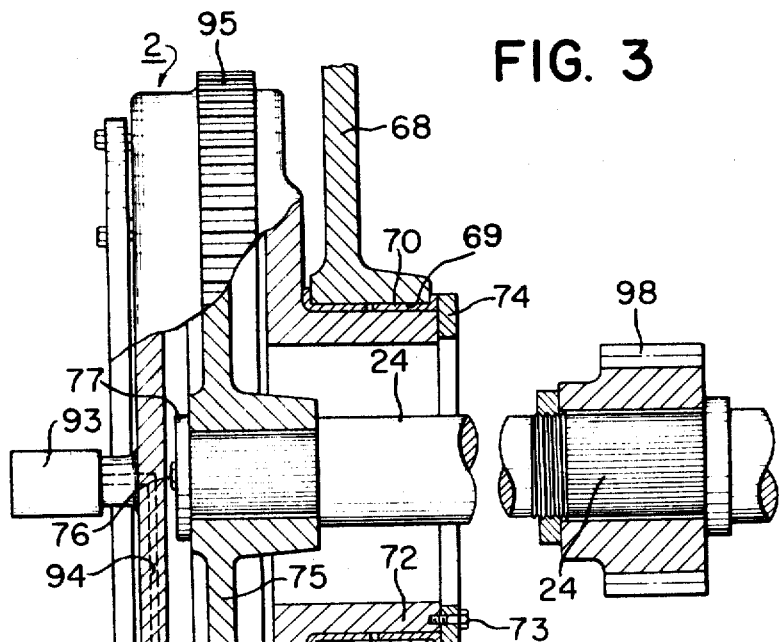
FIG. 3 is a sectional view of a clutch section.
Figure 5:
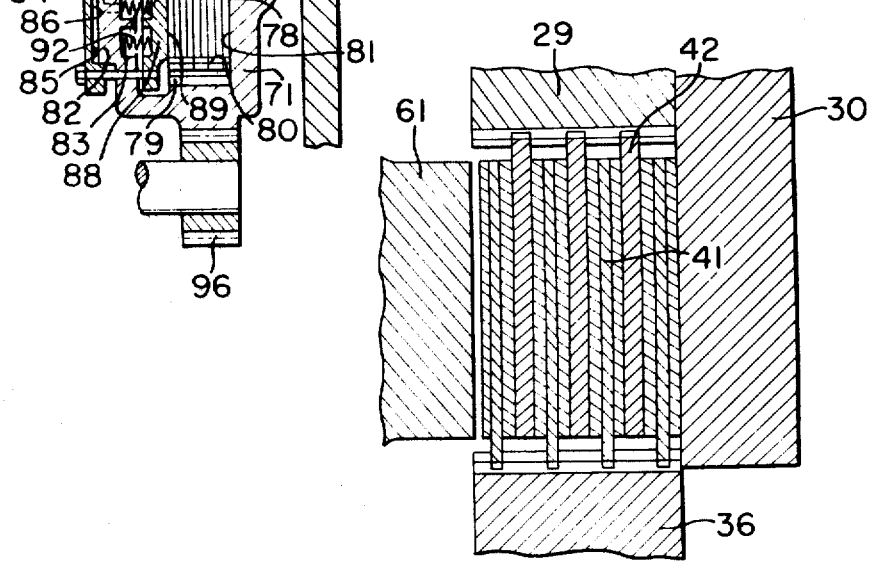
FIG. 5 is a detailed, sectional view showing a combination of lining materials and disk plates.

In the clutch section 2, the compressed air is supplied to the cylinder chamber 86 as shown in FIG. 3, through the timing valve 102 for the clutch, the cover member 84 is pressed outwardly to the left by the air pressure, draws the actuating member 88 towards the casing 71 through the bolts 90, 90. Since the actuating end of the actuating member 88 is spaced from the assembly of the disk plates 80 and the lining materials 78, the drive center 75 can rotate freely integral with the driving shaft 24.

Next, when the clutch is to be applied, the valves 99, 100 are opened, and the compressed air in the cylinder chambers 53, 58 are discharged, and separating the annular piston 61, 66 from each of the assemblies by means of the elastic forces of the springs 65, 67, and at the same time cutting off the supply of compressed air to the cylinder chamber 86 of the clutch section 2, the actuating member 88 shifts towards the assembly by the elastic force of the spring 92, the assembly of the lining materials and dish plates is pushed by the projected portion of the actuating member 88, thus the rotation of the center 75 is stopped by pressing the assembly against the flat abutting surface 81 of the casing 71, so that the driving shaft 24 is stopped or braked when gear 96 is held stationary by its inching motor or other means (not shown). Accordingly, since the driving gear 98 does not rotate, the slide of the press is stopped without rotating the main gear of the press.

Thus according to the present invention, the clutch section and the brake section are separated, the rotating shaft of the brake section and the driving gear are fixed, and the torque is transmitted to the driving shaft through the planet gear mechanism without directly driving the driving shaft which is fixed with the center at the end portion. Also, since the control of application and disengagement of the clutch is effected by the timing valve, the operation of the clutch is positive, and the reliability of operation is increased considerably.

The device according to the present invention has advantages over conventional devices in that the device can be made compact as a whole, and it can be disassembled easily for inspection, and particularly it can assure a positive transmission at a low temperature, thus it is quite effective for maintenance.

What is claimed is:

1. A driving device for presses characterized by consisting of a brake section and a clutch section, said brake section comprising: a brake casing fixed on the side wall of the press and forming a brake chamber, a supporting member fixed on said brake casing and having a projecting cylinder portion, a flywheel mounted on the projecting cylinder portion of said supporting member, a rotating shaft extending into the brake chamber passing through said projected cylinder portion and rotating integrally with the rotation of said flywheel, an annular pressure plate disposed in the brake chamber, a high speed disk plate holder and a low speed disk plate holder provided on opposite sides of said pressure plate, a high speed ring body and a low speed ring body each provided on its outer periphery with lining materials forming a friction brake corresponding to each of the disk plates of said disk plate holder and each provided on its inner periphery with gear teeth, high speed planet gears and low speed planet gears engaging simultaneously with a high speed sun gear portion and low speed sun gear portion respectively provided on said rotating shaft corresponding to the inner peripheral gear portion of said ring bodies, a rotating body having at its flange portion short shafts fixed rotatably with a pair of said high speed planet gear and low speed planet gear, a driving shaft rotatable integral with and rotatable but separated from said rotating shaft, an annular high speed cylinder chamber and low speed cylinder chamber allowing introduction of compressed air from compressed air supplying line and provided in the brake chamber, and annular pistons fitted in these cylinder chambers and pressingly contactable with the assembly consisting of said disk plates and lining materials; said clutch section comprising: a clutch casing supported rotatably on the side wall of the press, a center extending in said casing and mounted at the end portion of said driving shaft to which is fixed with a driving pinion, a disk plate holder provided on its inner periphery with disk plates corresponding to the lining materials provided on the outer periphery of said center, and mounted on the inner periphery of said clutch casing, an annular projection formed on the end surface of said clutch casing, an annular cover member surmounted on said annular projection and forming a cylinder chamber, an annular actuating member advancing and retracting with the advancing and retracting motions of said annular cover member, and at the same time pressedly contacting with the assembly of said disk plates and lining materials to press the plates and the lining materials together, and compressed air line for releasing the clutch communicating with said cylinder chamber; and timing valves provided in each of the operating circuits for each of the timing for relative operation of the brake section and the clutch section as well as the timing for relatively operation of the high speed portion and the low speed portion.

2. A driving device for presses characterized by consisting of a brake section and a clutch section, said brake section comprising: a brake casing fixed on the side wall of the press and forming a brake chamber, a supporting member fixed on said brake casing and having a projecting cylinder portion, a flywheel mounted on said projected cylinder portion of said supporting member, a rotating shaft extending into the clutch chamber passing through said projected cylinder portion and rotating integrally with the rotation of said flywheel, an annular pressure plate disposed in the brake chamber, a high speed disk plate holder and a low speed disk plate holder provided on opposite sides of said pressure plate, a high speed ring body and a low speed ring body each provided on its outer periphery with lining materials forming a friction brake corresponding to each of the disk plates of said disk plate holder and each provided on its inner periphery with gear teeth, high speed planet gears and low speed planet gears engaging simultaneously with a high speed sun gear portion or low speed sun gear portion provided on said rotating shaft corresponding to the inner peripheral gear portion of said ring bodies, a rotating body having at its flange portion short shafts fixed rotatably with a pair of said high speed planet gear, a driving shaft rotatable integral with and rotatable but separated from said rotating shaft, an annular high speed cylinder chamber and low speed cylinder chamber allowing introduction of compressed air from compressed air supplying line and provided in the brake chamber, and annular pistons fitted in these cylinder chambers and pressingly contactable with the assembly consisting of said disk plates and lining materials; said clutch section comprising: a clutch casing supported rotatably on the side wall of the press, a clutch center extending in said clutch casing and mounted at the end portion of said driving shaft to which is fixed with a driving pinion, a disk plate holder provided on its inner periphery with disk plates corresponding to the lining materials provided on the outer periphery of said center, and mounted on the inner periphery of said clutch casing, an annular projection formed on the end surface of said clutch casing, an annular cover member surmounted on said annular projection and forming a cylinder chamber, an annular actuating member advancing and retracting with the advancing and retracting motions of said annular cover member, and at the same time pressedly contacting with the assembly of said disk plates and lining materials to press the plates and the lining materials together, and compressed air line for releasing the clutch communicating with said cylinder chamber; an air line for connecting the cylinder chamber for high speed clutch and a directional control valve through a timing valve; an air line for connecting the cylinder chamber for low speed and said directional control valve through a timing valve; an air line for connecting the cylinder chamber for the clutch section and a timing valve for the clutch; an air line for connecting the air line for the brake section and the air line for the clutch section through a clutch brake directional control valve for supplying and stopping air for each of said valves; and timing valves provided in each of the operating circuits for each of the timing for relative operation of the brake section and the clutch section as well as the timing for relative operation of the high speed portion and the low speed portion.

3. A driving device for presses characterized by consisting of a brake section and a clutch section, said brake section comprising: a brake casing fixed on the side wall of the press and forming a brake chamber, a supporting member fixed on said brake casing and having a projecting cylinder portion, a flywheel mounted on said projecting cylinder portion of said supporting member, a rotating shaft extending to the clutch chamber passing through said projected cylinder portion and rotating integrally with the rotation of said flywheel, an annular pressure plate disposed in the brake chamber, a high speed disk plate holder and a low speed disk plate holder provided on opposite sides of said pressure plate, a high speed ring body and a low speed ring body each provided on its outer periphery with lining materials forming a friction brake corresponding to each of the disk plates of said disk plate holder and each provided on its inner periphery with gear teeth, high speed planet gears and low speed planet gears engaging simultaneously with a high speed sun gear portion or low speed sun gear portion provided on said rotating shaft corresponding to the inner peripheral gear portion of said ring bodies, a rotating body having at its flange portion short shafts fixed rotatably with a pair of said high speed planet gear and low speed planet gear, a driving shaft rotatable integral with and rotatable but separated from said rotating shaft, and annular high speed cylinder chamber and low speed cylinder chamber allowing introduction of compressed air from compressed air supplying line and provided in the brake chamber, and annular pistons fitted in these cylinder chambers and pressingly contactable with the assembly consisting of said disk plates and lining materials; said clutch section comprising: a clutch casing supported rotatably on the side wall of the press, a center extending in said clutch casing and mounted at the end portion of said driving shaft to which is fixed with a driving pinion, a disk plate holder provided on its inner periphery with disk plates corresponding to the lining materials provided on the outer periphery of said center, and mounted on the inner periphery of said clutch casing, an annular projection formed on the end surface of said clutch casing, an annular cover member surmounted on said annular projection and forming a cylinder chamber, an annular actuating member advancing and retracting with the advancing and retracting motions of said annular cover member, and at the same time pressedly contacting with the assembly of said disk plates and lining materials to press the plates and the lining materials together, a toothed portion being formed on the outer periphery of said clutch casing, a gear being engaged with said toothed portion, and compressed air line for releasing the clutch communicating with said cylinder chamber; timing valves provided in each of the operating circuits for each of the timing for relative operation of the clutch section and the brake section as well as the timing for relative operation of the high speed portion and the low speed portion, and the driving shaft being rotated at a low speed by the gear when the brake is opened and the clutch is applied.

* * * * *